Dec. 9, 1958  M. HINDEN  2,863,374
DAMPER ACTUATING CONSTRUCTION
Filed Jan. 21, 1955  3 Sheets-Sheet 2
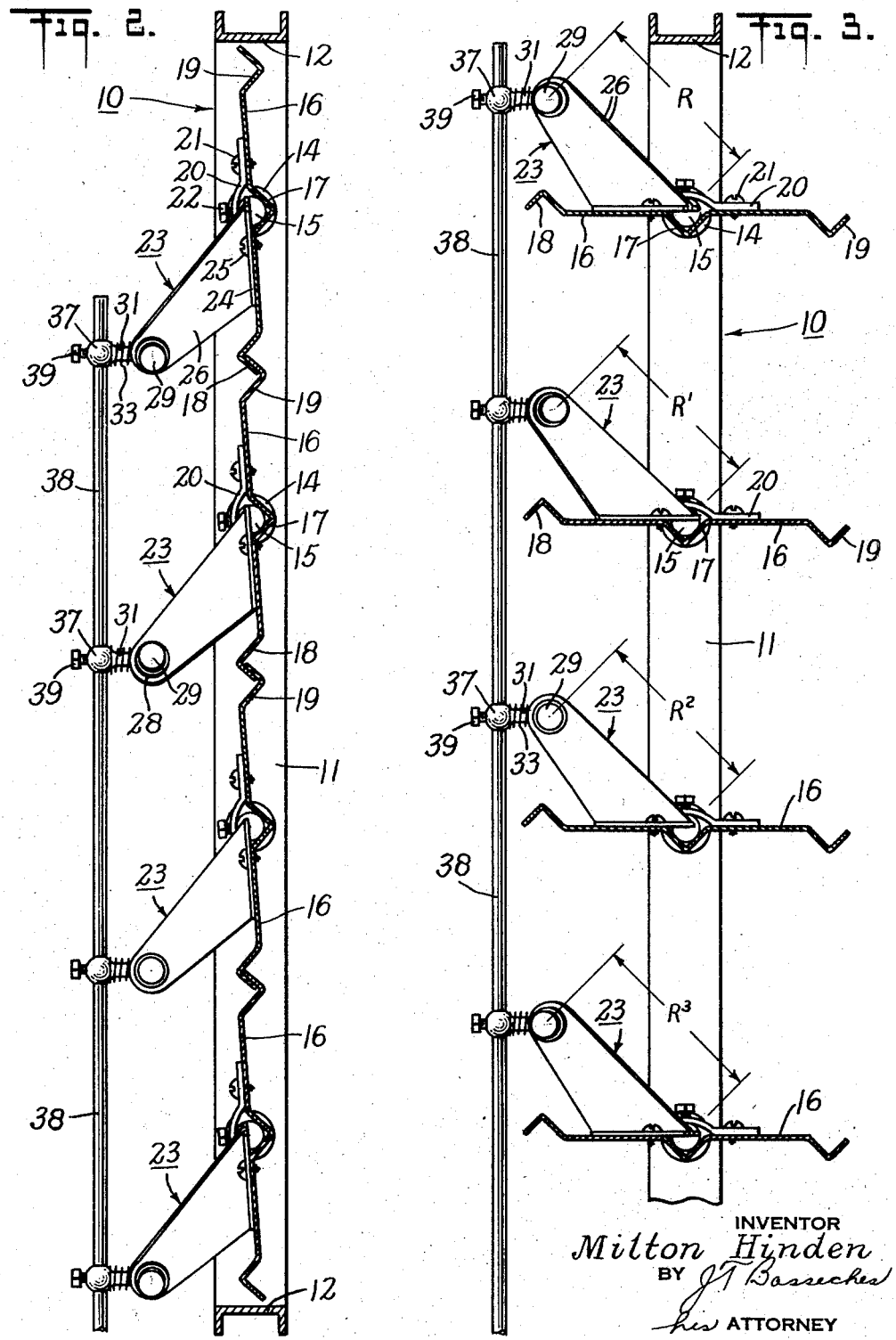
INVENTOR
Milton Hinden
BY J. T. Bassecher
his ATTORNEY Dec. 9, 1958 M. HINDEN 2,863,374
DAMPER ACTUATING CONSTRUCTION
Filed Jan. 21, 1955 3 Sheets-Sheet 3

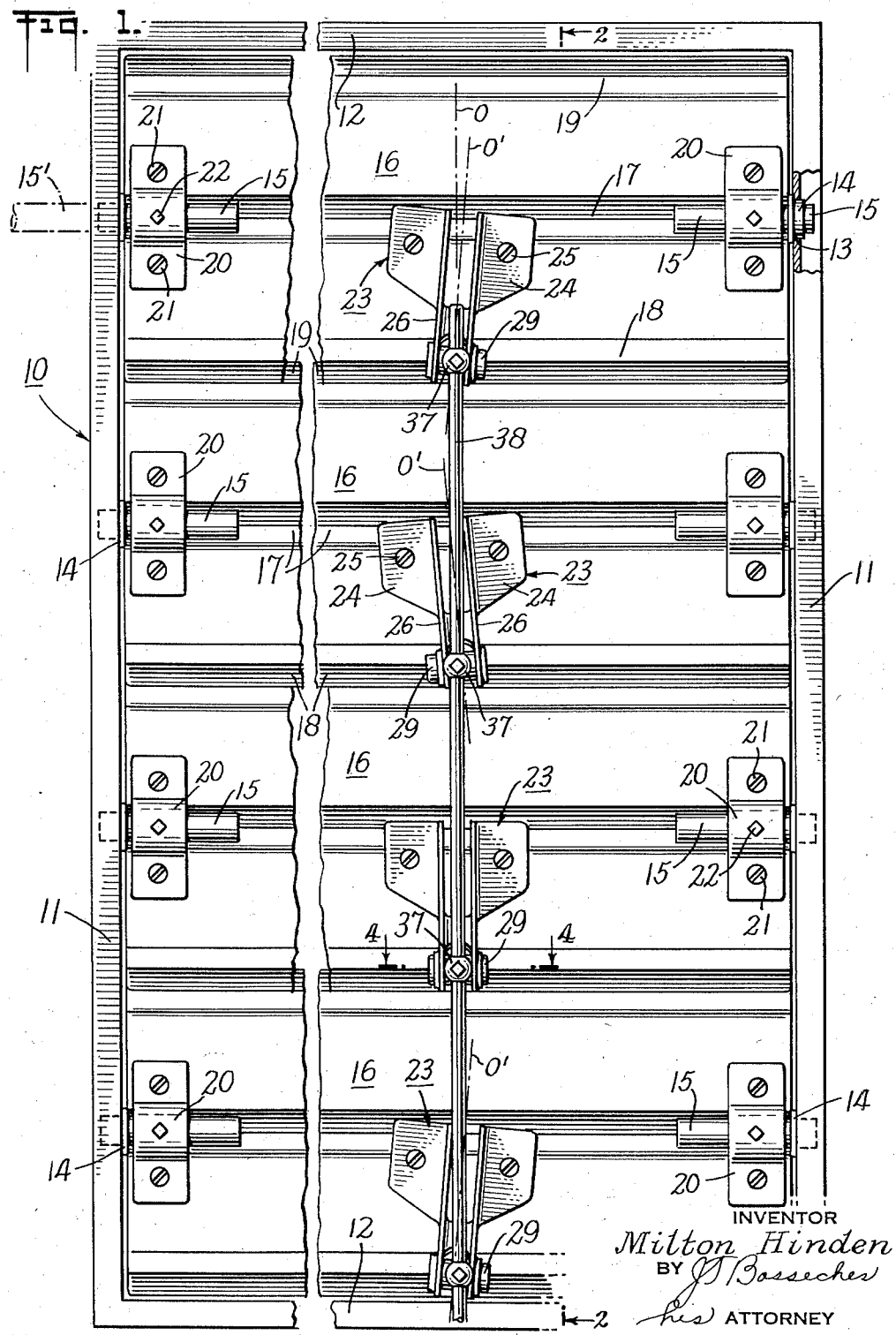

INVENTOR
Milton Hinden
BY
ATTORNEY great # United States Patent Office 2,863,374
Patented Dec. 9, 1958

2,863,374

DAMPER ACTUATING CONSTRUCTION

Milton Hinden, East Meadows, N. Y.

Application January 21, 1955, Serial No. 483,368

10 Claims. (Cl. 98—110)

This invention relates to damper hardware, and more particularly to damper blade actuating connectors, and still more particularly to dampers employing a plurality of blades which are actuated in unison to control the flow of air or like medium.

Known to me is the provision of a damper assembly wherein the frame has positioned thereon a plurality of damper blades pivotally mounted in said frame and actuated by a connecting member coupled through a bracket extending beyond the edge of each blade in which the connecting member comprises a continuous, flexible rod adapted to be flexed during movement of the connecting rod to compensate for irregularities in the construction of the damper mechanism. Yieldability of the connecting rod, while retaining stiffness longitudinally, resisting stresses of compression, has suggested the employment of a flexible rod to overcome the binding incident to such irregularities. Such construction is generally shown in the patent to Larson 2,210,869 of August 6, 1940.

Such mode of assembly which is dependent upon the flexibility of the connecting rod and high mechanical advantage leverage embodies attendant problems, especially in motorized units acting near the pivots for the blades, in that there is lacking the smoothness of operation needed to motivate the power to overcome the biasing force, overcoming the flexibility of the connecting rod and failure in accurate fit to a closed position after prolonged use, due to the development of permanent set in the relatively flexible connecting rod of relatively ductile iron wire.

It will be appreciated that other problems are also involved in the assembly of such dampers, especially when assembly is made in the field without the benefit of costly assembly jigs and tools to assure accuracy in installation of the blade pivots and actuating connectors.

Accordingly, it is contemplated by this invention to provide damper hardware which will simplify the installation in the field of a damper assembly comprising the frame, with one or more damper blades, to secure so-called custom size installation, while furnishing a damper assembly which may be installed without engendering problems due to simple irregularities or faulty and inaccurate technique in producing the frame, the associated pivotal mounting of the blades, and at the same time affording an elimination of many of the problems involved in such field construction and installation, to secure smoother operation, minimizing of the power necessary to actuate the pivotal movement and avoiding any tendency of the dampers to acquire an irregular set or to further vibrate and become noisy in use.

Still more particularly it is an object of this invention to provide damper hardware comprising a blade actuating bracket member for use with an actuating rod having reach arm or coupling means between the bracket and connecting rod wherein the coupling between the blade and the rod is characterized by a sliding and pivotal yielding connection, compensating for irregularities in the assembly comprising the bearings for pivotally mounting the blade, variation in the radial displacement of the bracket with regard to the pivotal bearing or of the bracket members to each other; misalignment or askew position of the bracket member on the blade or with respect to other of the various blades; more particularly, to secure sliding and/or pivotal movement without vibration due to slack, and thereby minimize the power factor in moving the blades to and from open or closed position, and accordingly, providing an installation which may be made with the minimum of expensive, skilled labor and with substantial economies by reason of the savings in time involved in the completion of the assembly.

Still more particularly, it is an object of this invention to provide a bracket assembly for use in attaching to damper blades, particularly those installed in the field, which will facilitate assembly, economize on labor and eliminate a large number of the problems facing workers in the field in making a custom construction and installation of a damper assembly and particularly providing smooth operation, free from jerkiness, and having low power factors in operation yieldably compensating in overcoming inaccuracies due to untrue alignment, lack of conformation in size of related damper blades, where a plurality thereof are employed; elimination of set due to biasing action; elimination of vibration due to slack; minimum departure in movement from a fully closed to a fully open position.

Still more particularly, it is an object of this invention to provide damper hardware comprising a coupling between a bracket member and the actuating member comprising a connecting rod, in which the coupling, during actuation, yields pivotally and slidably, to afford yieldability of the actuating rod and bracket element to each other in the plane of the actuating member, as well as bodily relatively to each other, of the bracket and actuating rod, with the minimum amount of power factor components to motivate movement, whereby a yieldable as well as stiff connecting rod member may be employed and thereby effect economies in labor and material, notwithstanding a wide variety of inaccuracies or irregularities in assembly of the cooperating blade frame and actuating elements.

To attain these objects and such further objects as may appear herein or be hereinafter pointed out, I make reference to the accompanying drawings, forming a part hereof, in which:

Figure 1 is a front elevational view of a damper assembly in accordance with my invention;

Figure 2 is a longitudinal section taken on the line 2—2 of Figure 1;

Figure 3 is a view similar to Figure 2, with the damper assembly moved to the fully open position;

Figure 4:
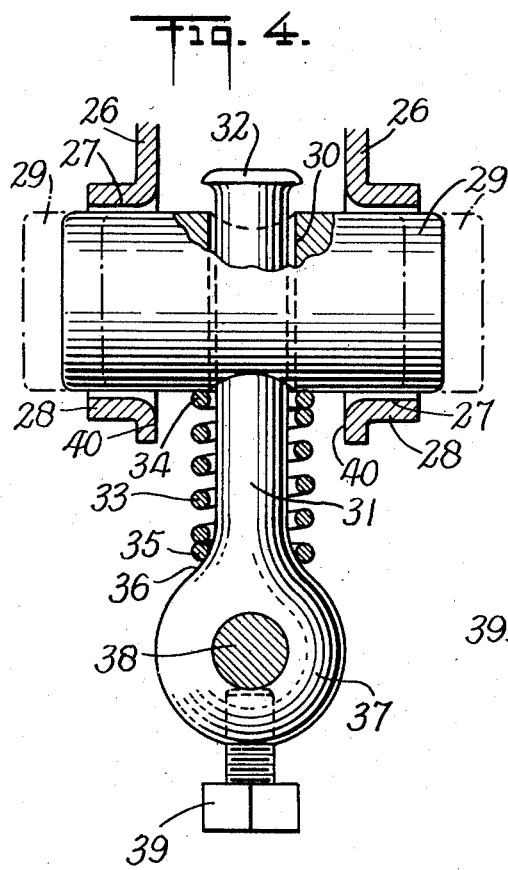
Figure 4 is a magnified fragmentary section taken on the line 4—4 of Figure 1.

Making reference to the drawing, my invention is illustrated in conjunction with a damper installation comprising a rectangular frame 10 having vertical frame members 11 and horizontal frame members 12 joined to each other in size and proportion to fit some ceiling, wall, floor opening or duct through which it is desired to distribute heating or cooling air or like medium.

The frame may also be part of some of the stiffening supports of a duct, as will readily be apparent, and in the form illustrated comprises U-shaped channel members in cross section.

The vertical members 11 may be formed with raw punched holes or bores 13 into which are positioned, by a friction or driving fit, bushings 14 in diametrically opposed relation on the vertical frame members 11.

Pairs of the bushings are arranged to receive bearing pins 15 for pivotally supporting the blades 16.

The blades are made of sheet metal, each formed with a central rib 17 and terminal ribs 18 and 19 formed in opposed direction to each other. The ribs may be formed by sharp bends longitudinally of the blade. The central rib 17 forms a seat for the bearing pins 15 which extend into the bushings previously described. One of the pins 15' may extend outside of the frame to provide a shaft for motorized control, as will be readily understood. The pins are held in the seat formed by the central rib 17 by means of encasing straps 20, fastened by the screws 21 to engage one face of the blade. A set screw 22 holds the pin in non-rotational relation to the blade, to direct the pin rotationally within the bushing upon pivotal movement of the blade.

In the illustration shown, the various blades are arranged in parallelism, each of the opposed ribs 18 and 19 being conformingly faced to cooperate with adjacent blades to form a sealed or interlocking engagement. For actuating the blades in unison, each is provided with a bracket 23 comprising base portions 24 through which fastening elements 25 are directed, such as screws or rivets passing through the blade surface to hold the brackets in extended position for leverage action about the pivots 15.

Each bracket is formed with spaced arms 26 having bearings 27 formed adjacent the ends thereof, preferably by protruding a flange portion 28. Rotationally extended within the bearing 27 there is positioned the trunnion 29 which is rotationally set within the bearing 27 and is sufficiently extended to slide along the longitudinal axis of the trunnion in either direction along the bearing 27, as more clearly shown in dotted lines in Figure 4.

The trunnion 29 is provided with a transverse bearing 30, through which extends the reach arm 31 in pivotal and slidable relation thereto. One end of the reach arm 31 is headed or staked at 32 to block its removal through the bearing 30. The other end of the reach arm has sleeved thereover a compression spring 33. One end 34 of the compression spring 33 bears against the trunnion 29. The other end 35 bears against a face 36 of the eye or ball 37 into which the reach arm is fixed. The eye 37 affixed to the reach arm 31 is arranged to receive an actuating rod 38. Fixed relation of the eye 37 and the actuating rod 38 is effected by a set screw 39 passing through the wall of the eye to engage the rod 38.

The compression spring 33, as illustrated, may be cylindrically wound or conically wound, and where conically wound is placed with the larger end 34 as described in contact with the trunnion and the smaller end 35 in contact with the face 36 of the eye, thereby providing resilient yieldability longitudinally as well as laterally between the faces 40 of the bracket arms 26, 26.

With a bracket assembled as described, it will be observed that a coupling is secured between the actuating rod 38 and the bracket 23 to prevent bending stresses on the rod 38 while retaining along the axis of the reach arm 31, which may slide as well as move pivotally along the bearing 30 of the trunnion 29. There is a movement of the rod 38 bodily along the axis of the trunnion 29, to provide bodily relative movement of the reach arm 31 to the trunnion 29. With this form of coupling of the rod 38 and bracket 23, each of the blades of a multiple damper blade assembly within a frame or the like may have positioned thereon a bracket 23, either arranging the bracket arm on the respective blades in parallel or having one pair in opposed relation to another pair in what is known as opposed damper blade assembly.

The brackets may be directly fixed to the blades or so as to have one or more of the brackets upon stands extended from the blades, in accordance with practice well known in the field, to secure opposed blade action in accordance with desired air or like medium control through the ducts or the opening to be controlled by the blade assembly.

In the embodiment illustrated in Figures 1 to 3, I show the bracket 23 mounted upon the respective blades in a parallel set-up. The brackets 23 may extend to have the bearing portions 27 within the confines of the blade edges 18. The brackets are positioned in alignment along the transverse axis O of the frame. In Figure 1, I have shown a plurality of such brackets, with the subsidiary center line O' of each bracket deliberately displaced from coincidence with the axial line O.

With the construction I have described, and illustrated for exemplification in an exaggerated faulty positioning of the brackets, on the faces of each of the blades 16, the radii R, $R^1$, $R^2$, $R^3$, are each dissimilar and askew in respect of the center O'. The brackets may be coupled to operate in unison by the connecting rod 38 which passes through the respective eyes 37, extending from each of the reach arms 31 since each of the reach arms 31, with the corresponding trunnion 29, yields slidably and rotationally with respect to the bearing 27 on the bracket arm. Misalignment due to the askew position of the bracket 23 is compensated for by the bodily pivotal and slidable movement of the coupling rod 38 relatively to each of the bearings 27 on the brackets.

Likewise, inaccuracies in location of the brackets with respect to the center line of the pins 15, causing a difference in radial displacement of the bearings 27 to the center line through the blades to inadvertently secure dissimilar radii R, $R^1$, $R^2$, $R^3$, will in no way cause a bending force to be exerted in moving the connecting rod bodily to rotate the blades in unison, as differences in radial displacement will automatically become adjusted as the reach arms 31 slide as well as pivot within the cooperating bearings 30 to equalize the difference in radial displacement, should this inadvertently occur.

The inclusion of the compression spring 33 serves to take up all slack between the surface of the trunnion 29 and the shoulder 36 by reason of the differences in radial extension which may occur along the axial line through the reach arm, thereby to maintain the connecting rod 38 in alignment, without bending stresses or longitudinal flexing. By employing, optionally, a conically wound compression spring 33, lateral deflection of the trunnion with respect to the edges 40 will be biased to have the slack taken up, and thereby minimize or completely reduce rattle or independent fluttering of the blades within the limits of the tension of the compression spring in the direction of the spring tension as high velocity forces of the circulating medium, such as air, are directed through the damper assembly.

Likewise, by including a reach arm coupling assembly as described, the bearing supporting end 27 of each bracket may be retained within the confines of the edges 18 and 19 of each blade to minimize the over-all dimension of the assembly in depth as the blades are moved in unison from the fully closed position shown in Figure 2 to the fully opened position shown in Figure 3. End clearances adjacent the horizontal frame members 12 are thereby also reduced to the minimum when the damper assembly is moved to the fully closed position.

Thus, in accordance with the leverage which may be desired to be exerted about the axial line through the bearing pins 15, the bracket arms 23 may be extended with relation to the center inwardly or outwardly within the limits of the length of the reach arm 31 without sacrificing actuating movement or increasing the power factor for moving the blades in unison, directly or indirectly, through the connecting rod 38, due to any faulty alignment or location of the bracket arms or by employing low standards of tolerance in measurement in pivotal mounting of the blades.

By the construction described, slidable and pivotal yieldability of the coupling between the bracket and the connecting rod eliminates bending stresses with relation to the rod 38, and thereby maintains the power factor for moving the blades in unison to the minimum. Where the assembly is regulated by some motorized unit under thermostatic control, smooth and efficient changes occur by so minimizing the power factor.

Figure 5:
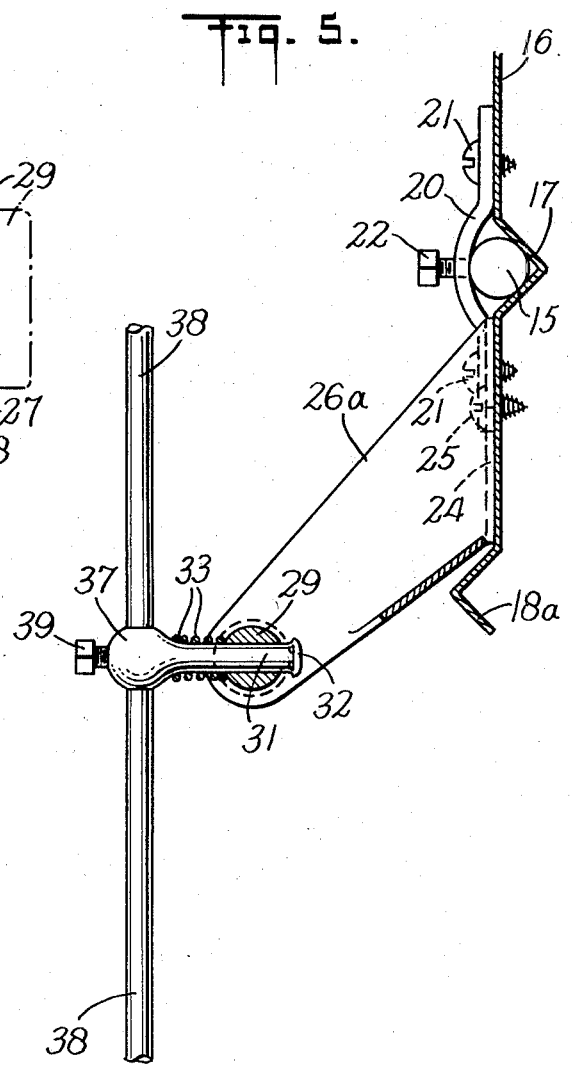
Figure 5 is a magnified fragmentary section of another embodiment of my invention.

While I have shown and described a relationship of each of the bracket arms 23 to the respective blades 16, to retain the bearing end 27 of each bracket within the confines of the edges 18 and 19, I may, as illustrated in Figure 5, provide a bracket 26a of a length which extends beyond the edge 18a. The use of more extended bracket arms would ordinarily magnify the inaccuracy in supporting the bracket. With such more extended brackets, these magnified deflections do not interfere with the smooth coupling between the actuating rod and the bracket, when employing the coupling in accordance with my invention, to provide pivotal as well as slidable yielding connection.

While I have shown and described a damper assembly comprising a plurality of damper blades pivotally mounted to be actuated in unison where all of the blades are assembled in parallel or assembled in staggered or opposed relation to secure the smooth, non-binding, low power factor actuation by reason of high tolerances or inaccuracy in assembly, it will be understood that some of the benefits may be secured by using the brackets as a single blade actuating member.

Likewise, it will be observed that by my construction a coupling is secured between the actuating rod and the damper blades, serving to operate the damper blades in unison by a compensating slidable, pivotal and bodily movement of the reach arms in relation to the blades, to permit the employment of actuating rods of low yieldable character. Thus, by avoiding the flexing stresses on the connecting rod, relatively stiff or brittle connecting rod material may be employed, preventing inaccuracies due to the formation of a permanent set experienced with yieldable, flexible and malleable rods, as the connecting rod or connecting member which may be employed here is not dependent upon yieldable bending stresses to compensate for any accidental misalignment occurring in assembling any of the parts in the field, where jigs are not conveniently available.

Having thus described my invention and illustrated its use, what I claim as new and desire to secure by Letters Patent is:

1. A bracket for damper blades arranged to be connected to said damper blades and coupled by a connecting rod for operating a plurality of said blades in unison, said bracket having a base for extending the same from said blade, a pair of spaced arms extended from said base, bearings adjacent the end of said arms, a pivotal and slidable trunnion pin supported in said bearings, a reach arm mounted in said trunnion and a connecting eye on said reach arm for coupling to said connecting rod, said trunnion having a bearing into which said reach arm extends pivotally and slidably, means to limit the sliding movement of said reach rod in said trunnion and a compression spring spaced between said connecting eye and trunnion pin for taking up the slack between said eye and trunnion pin.

2. A bracket for damper blades arranged to be connected to said damper blades and coupled by a connecting rod for operating a plurality of said blades in unison, said bracket having a base for extending the same from said blade, a pair of spaced arms extended from said base, bearings adjacent the end of said arms, a pivotal and slidable trunnion pin supported in said bearings, a reach arm mounted in said trunnion and a connecting eye on said reach arm for coupling to said connecting rod, said trunnion having a bearing into which said reach arm extends pivotally and slidably, means for limiting the slidable movement and a compression spring spaced between said connecting eye and trunnion pin for taking up the slack between said eye and trunnion pin, said compression spring having lateral as well as longitudinal yielding compressive action between said eye and trunnion pin.

3. In a damper mechanism having a damper frame adapted to be positioned in a passage to control the flow of air or the like medium by means of blades having a pivotally mounted support therefor in said frame, each blade having a leverage exerting bracket for pivotally controlling said pivotal movement of said blade in said frame and adapted to be connected to an actuating connecting rod for movement of said blade, each of said brackets having a base and means for connecting said bracket to actuate said blade about its pivotally mounted support, leverage arm means extended from said base, transversely extending bearing means on said leverage arm means spaced from said base, trunnion means supported in said last mentioned bearing means, a reach arm, means for slidably mounting said reach arm in relation to said trunnion means to provide a variable point of leverage on said arm, said reach arm having means for coupling one portion thereof to said actuating connecting rod and other means to limit the movement of the variable point of leverage of said reach arm in relation to said trunnion.

4. In a damper mechanism having a damper frame adapted to be positioned in a passage to control the flow of air or like medium by means of blades pivotally mounted in said frame, each blade having a bracket adapted to be coupled to a connecting rod for pivotally controlling said pivotal movement of said blade in said frame, each of said brackets having a base and means on said base for connecting said bracket to said blade, leverage arm means extending from said base, a transversely extending bearing on said leverage arm means, trunnion means slidably and pivotally supported in said bearing, a reach arm, means for pivotally and slidably mounting said reach arm on said trunnion means to provide a variable point of leverage of said reach arm, said reach arm having means for coupling one portion thereof to said connecting rod and means on the other portion thereof to limit the sliding movement of the reach arm in relation to said trunnion.

5. A bracket for a damper blade adapted to be coupled to a connecting rod for actuating said blade comprising a base for connecting said bracket and blade to each other to pivot said blade, said base having leverage arm means extended therefrom, a bearing on said leverage arm means spaced from said base, a trunnion supported in said bearing, transverse bearing means on said trunnion, reach arm means slidably mounted in said last mentioned bearing means to provide a variable point of leverage of said reach arm means, said reach arm means having coupling means adjacent one portion thereof for connecting said coupling means to said actuating connecting rod and motion limiting means for said reach arm to limit the sliding movement of the reach arm means in relation to said trunnion.

6. A bracket for a damper blade adapted to be coupled to a connecting rod comprising a base having means for connecting the same to said blade, said base having a pair of arms extended therefrom, a bearing on said arms spaced from said base, a trunnion supported in said bearing, transverse bearing means on said trunnion, a reach arm slidably and pivotally mounted in said last mentioned bearing means, said reach arm having coupling means for said connecting rod adjacent one end thereof and sliding motion limiting means on the opposed end of said arm.

7. A bracket for a damper blade adapted to be coupled to a connecting rod comprising a base having means for connecting the same to said blade, said base having a pair of arms extended therefrom, a bearing on said arms spaced from said base, a trunnion supported in said bearing, transverse bearing means on said trunnion, a reach arm slidably and pivotally mounted in said last bearing means, said reach rod having an eye coupling means adjacent one end for connection to said connecting rod and motion limiting means adjacent the opposite end of said reach arm.

8. A bracket for a damper blade adapted to be coupled to a connecting rod to actuate said blade through said bracket, comprising a base having means for connecting the bracket to said blade, said base having a pair of spaced arms upstanding from the base, aligned bearings spaced from said base formed in said arms, a trunnion supported in said bearings, a bearing in said trunnion transversely extended to said aligned bearings, a reach arm slidably and pivotally mounted in said last mentioned bearing, said reach arm having an eye coupling means adjacent one end for connection to said connecting rod and motion limiting means adjacent the opposite end of said reach arm to limit the sliding movement of said reach arm to said trunnion.

9. A bracket for a damper blade adapted to be coupled to a connecting rod for actuating said blade comprising a base for connecting said bracket and blade to each other, to pivot said blade, said base having leverage arm means extended therefrom, a bearing on said leverage arm means spaced from said base, a trunnion means supported by said bearing, transverse bearing means on said trunnion means, reach arm means and means for slidably mounting said reach arm means in relation to said trunnion means to provide a variable point of leverage on said leverage arm means, said reach arm means for coupling one portion thereof to said actuating connecting rod and other means to limit the movement of the variable point of leverage on said arm means in relation to said trunnion means.

10. A bracket for a damper blade adapted to be coupled to a connecting rod for actuating said blade comprising a base for connecting said bracket and blade to each other, to pivot said blade, said base having leverage arm means extended therefrom, a bearing on said leverage arm means spaced from said base, a slidable trunnion means supported by said bearing, transverse bearing means on said trunnion means, reach arm means and means for slidably mounting said reach arm means in relation to said trunnion means to provide a variable point of leverage on said leverage arm means, said reach arm means having means for coupling one portion thereof to said actuating connecting rod and other means to limit the movement of the variable point of leverage on said arm means in relation to said trunnion means.

References Cited in the file of this patent

UNITED STATES PATENTS

| | | |
|---|---|---|
| 1,684,512 | Olinger | Sept. 18, 1928 |
| 2,040,893 | Young | May 19, 1936 |
| 2,210,869 | Larson | Aug. 6, 1940 |
| 2,326,408 | Strawsine | Aug. 10, 1943 |

FOREIGN PATENTS

| | | |
|---|---|---|
| 107,112 | Great Britain | June 21, 1917 |
| 785,741 | France | May 20, 1935 |

UNITED STATES PATENT OFFICE

CERTIFICATE OF CORRECTION

Patent No. 2,863,374 December 9, 1958

Milton Hinden

It is hereby certified that error appears in the printed specification of the above numbered patent requiring correction and that the said Letters Patent should read as corrected below.

Column 7, line 28, after "means" insert -- having means --.

Signed and sealed this 14th day of July 1959.

(SEAL)
Attest:

KARL H. AXLINE
Attesting Officer

ROBERT C. WATSON
Commissioner of Patents